Patented Jan. 21, 1930

1,744,534

UNITED STATES PATENT OFFICE

THOMAS A. EDISON, OF LLEWELLYN PARK, WEST ORANGE, NEW JERSEY, ASSIGNOR TO THOMAS A. EDISON, INCORPORATED, OF WEST ORANGE, NEW JERSEY, A CORPORATION OF NEW JERSEY

PRODUCTION OF MOLDED ARTICLES

No Drawing.    Application filed January 29, 1926.    Serial No. 84,763.

My invention relates to the production of molded articles, such as phonograph record blanks, and more particularly to an improved material or composition from which said molded articles are adapted to be formed, and an improved binder for such material. My invention also relates to the method of making this material or composition.

One of the principal objects of my invention resides in the production of a material for molded articles which is of superior quality so that when formed into a molded article under heat and pressure it will be hard, tough, smooth and of substantially uniform density and texture throughout.

Another object of my invention is to provide a material for molded articles which is highly water-repellent so that molded articles produced therefrom will be undamaged by exposure to moisture.

In carrying out my invention I first make the binder for the composition to be molded by mixing any of a number of different resins, but preferably ordinary pine rosin, with the material known in the petroleum trade as "B. S." and also as "wax tailings." This material apparently consists of a very heavy hydrocarbon and represents the fraction obtained in the dry distillation of non-asphaltic and mixed-base petroleum and recovered immediately prior to coking. The same product is found in pipe lines and in the bottom of tanks which have been used for any considerable period for storing crude petroleum. It does not appear to be soluble to any extent in petroleum and under ordinary conditions is probably held in suspension therein; but when crude petroleum is permitted to remain quiescent for a considerable time, the "B. S." settles out. The proportion of rosin and "B. S." employed are subject to considerable variance but I find the best proportions to be from 85 parts by weight of rosin and 15 parts by weight of "B. S." to 90 parts by weight of rosin and 10 parts by weight of "B. S." In forming this mixture the rosin and "B. S." are either melted together in a single container or are melted in separate containers and the contents of one container poured into the other container, and the melted materials are then stirred until thoroughly mixed. The resulting product is a binder of superior quality which is neither too sticky nor too brittle when hardened.

The binder produced as described is hardened by cooling and reduced to the form of a powder, and is then mixed with a filler material comprising any suitable finely divided inert substance, but preferably a mixture of powdered wood flour and chalk, in a steam-jacketed mixer which is preferably heated with super-heated steam at a temperature sufficient to reduce the rosin, "B. S." binder to a thin liquid, and preferably at a temperature of from 600 to 700 degrees Fahrenheit. The mixer is maintained in operation until the ingredients become thoroughly mixed, which usually takes about one hour. In this operation all the particles of wood flour and chalk are thoroughly coated by the rosin, "B. S." binder. When wood flour and chalk are used for the filler of my improved material, I find that good results are obtained by using about 12 per cent by weight of the rosin, "B. S." compound or binder, about 50 per cent by weight of wood flour, and about 38 per cent by weight of chalk, although these proportions may be considerably varied.

The material which is now in a slightly tacky condition, is removed from the mixer and cooled as by placing the same in a rotating drum and spraying the drum with cold water. After being cooled the material is ground in a ball or pebble mill preferably to such a fineness that 90 to 95 per cent thereof will pass through a 180-mesh screen.

After being ground the material is ready for molding. In making disc record blanks this ground material is placed in suitable molds and formed under heat and hydraulic pressure into discs. The surfaces of the blanks thus produced are very smooth and the blanks are hard and tough and of substantially uniform density and texture. Moreover, because of the improved binder employed, which is highly water-repellent, there is little likelihood of these blanks being affected by moisture.

Disc record blanks formed as described above may be covered with a suitable veneer or coating of record receiving material such as the varnish consisting of a mixture of phenol resin and hexamethylene-tetra-amin, described in Patent No. 1,098,608, granted June 2, 1914 to Aylsworth. The varnish referred to is preferably applied by brushing or painting or by flowing the same onto the blank. After the varnish has been dried to set the same, as by subjecting the coated blank to heat in an oven, the sound record is impressed therein under great heat and pressure in a suitable mold provided with a sound record matrix. Sound records thus produced will be free from "run-outs" due to the absence of "hard spots" in the blanks formed of my improved material and, moreover, such records when reproduced are substantially free from "scatch." This I believe to be due to the facts that a blank formed of my improved material is substantially perfectly smooth with all of the fibres and other particles of the filler entirely covered with the "B. S." rosin binder, and that this binder is so strong that it successfully resists the natural tendency which the particles of the filler have, because of their elasticity, to spring back or apart after being compacted or forced together under the heavy pressures to which the same are subjected in molding the blank and in impressing the record into the coated blank.

While my improved material is especially designed for use in making sound record blanks, the same is adapted to be used in making numerous other molded articles. Moreover, it is to be understood that my invention is subject to various changes and modifications, especially as to certain of the ingredients of my improved material and the specific method described for making such material, without departure from the spirit of the invention or the scope of the appended claims.

Having now described my invention, what I claim as new and desire to protect by Letters Patent, is as follows:

1. A sound record blank comprising a finely divided filler material held together by a binder comprising a mixture of about 85 to 90 parts by weight of rosin and about 10 to 15 parts by weight of a petroleum residue known as "B. S.", substantially as described.

2. A sound record blank comprising about 88 parts by weight of a finely divided filler material held together by about 12 parts by weight of a binder comprising a mixture of rosin and a petroleum residue known as "B. S.", substantially as described.

3. A sound record blank comprising about 88 parts by weight of a finely divided filler material held together by about 12 parts by weight of a binder comprising a mixture of rosin and a petroleum residue known as "B. S.", said mixture containing about 85 to 90 parts by weight of the rosin and about 10 to 15 parts by weight of the "B. S.", substantially as described.

4. A sound record blank comprising a filler material consisting of a mixture of powdered chalk and wood flour held together by a binder comprising a mixture of rosin and a petroleum residue known as "B. S.", said blank containing about 50 parts by weight of the wood flour, about 38 parts by weight of the chalk and about 12 parts by weight of the binder, substantially as described.

5. A sound record blank comprising a filler material consisting of a mixture of powdered chalk and wood flour held together by a binder comprising a mixture of rosin and a petroleum residue known as "B. S.", said blank containing about 50 parts by weight of the wood flour, about 38 parts by weight of the chalk and about 12 parts by weight of the binder, and said binder being formed of about 85 to 90 parts by weight of the rosin and about 10 to 15 parts by weight of the "B. S.", substantially as described.

6. A binder for molding compositions comprising a mixture of about 85 to 90 parts by weight of rosin and about 10 to 15 parts by weight of a petroleum residue known as "B. S.", substantially as described.

7. A composition adapted for use in forming molded articles comprising a mixture of a filler material and a binder material comprising a mixture of about 85 to 90 parts by weight of rosin and about 10 to 15 parts by weight of a petroleum residue known as "B. S.", substantially as described.

This specification signed this 25th day of January, 1926.

THOS. A. EDISON.